Jan. 2, 1951  M. I. DORFAN  2,536,042
METHOD OF PRODUCING A GRANULE COATED BASE
Filed Nov. 6, 1946  6 Sheets-Sheet 5

Patented Jan. 2, 1951

2,536,042

UNITED STATES PATENT OFFICE 2,536,042

METHOD OF PRODUCING A GRANULE COATED BASE

Morton I. Dorfan, Pittsburgh, Pa., assignor to Koppers Company, Inc., a corporation of Delaware Application November 6, 1946, Serial No. 708,096

4 Claims. (Cl. 117—32)

The present invention relates to improvements in methods of and apparatus for applying coatings to sheet materials, and to methods of operating such apparatus. More particularly, the invention relates to improvements in the production of coated metal sheets having extensive surface areas and to which solid particulate material is bonded for protective, decorative, camouflage or other purposes.

Metal roofing and siding sheets for construction of houses, sheds, and other structures are commonly protected against corrosion and other effects of exposure and handling by coating them with heat-liquefiable or thermoplastic compositions such as tar, pitch or asphalt, and by bonding thereto particles of minerals such as slate, mica and the like. In providing a sheet coated with such particles, it is important that the particles adhere uniformly and that they completely and uniformly cover the entire surface of the sheet. This is difficult to attain particularly in large scale, high-speed production.

In the present invention, the above desired uniformity is obtained by various means while effecting an increase in the rate of production and greatly simplifying the apparatus needed for providing the improved results. In order to obtain uniform adherence and coverage of solid particulate substances on the entire surface of a thermoplastic precoat, the latter should be uniformly sticky or uniformly softened over its entire surface and the precoat must remain permanently in position on the surface of the sheet. To prevent sagging it has been found preferable to permit a thermoplastic coating to harden on a sheet before heat is applied to render the coating sticky for bonding solid particulate material, rather than to apply solid particulate material immediately after the sheet is coated with the liquid thermoplastic material or before it has initially set.

To heat the entire surface area or superficies of the thermoplastic coating on a sheet of extensive area at one time and to render the entire coating surface uniformly sticky, hot circulating gases are brought into contact with, and envelope the entire area of the coating. The coated sheet is maintained in such contact for a period sufficient to render the coating sticky without causing it to flow, and to maintain it so until the solid particulate material is applied. The method and means of applying heat in the present invention makes it possible to convey coated sheets in vertical position for the application of the solid particulate material to both sides of the sheets without the necessity of turning them. The particulate solids projected onto the sticky surface are preferably preheated so that they may more readily become at least partially embedded in the precoat.

The particulate solids or "dust" particles should, for certain purposes, be of a size to insure thorough coverage of the coated sheet. Since the larger particles are preferable in such cases, smaller particles are removed initially or before recirculation of unused particles. When the smaller particles in a "dust" are in too great concentration and when they reach and adhere to the sticky surface of a sheet before the larger particles, the smaller particles tend to prevent the proper adherence of the larger, better-covering particles.

The terms "dust" and solid particulate material as employed herein refer to granules which may be of any suitable size in the range of about 10 to 100 mesh and preferably 10 or 20 to 40 or 50 mesh. Granules employed have surfaces which have any one or more of the following characteristics: curved and shell-like, flat, approximately even planes, very uneven, rough, or irregular. The granules may be made up of natural granules, artificially colored granules, synthetic granules or mixtures of granular substances. Materials most commonly used are slate, greenstone, chert, flint, quartzite, rhyolite, quartz sand, quartz river gravels, limestone, feldspar, granite, ore tailings, slag, shale, crushed brick and tile, mica, talc, and foliated talc. Asbestos fiber, paper flock, abrasive dusts, organic dusts, and metal powders may also be employed.

Further details of the present invention are described hereinbelow and are shown in the accompanying drawings in which.

Similar parts of the apparatus are designated by the same reference characters in the various figures.

Figures 1, 14, 15:
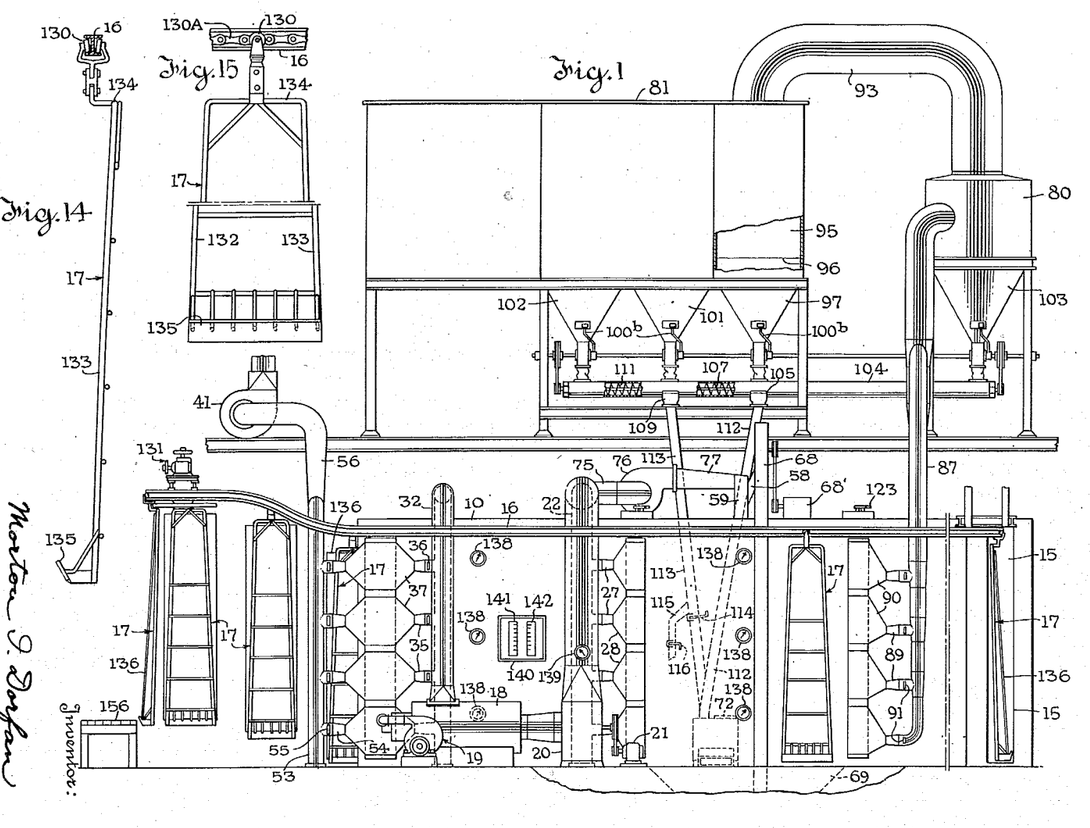
Fig. 1 is a side elevational view of a "dusting" plant.
Fig. 14 is a side view of a rack for conveying a sheet through the tunnel.
Fig. 15 is a front view of the rack.
Figures 2, 16:
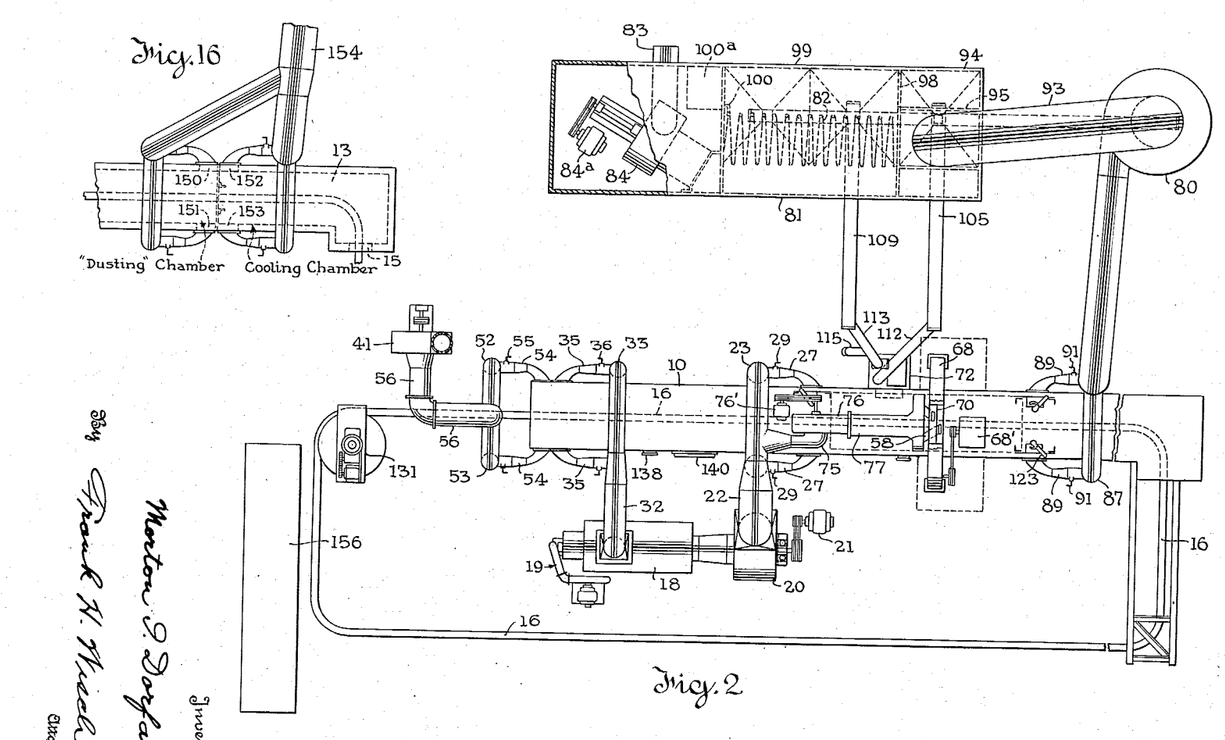
Fig. 2 is a top view of the plant shown in Fig. 1.
Fig. 16 is a view showing a modified arrangement of flues for the "dusting" and cooling sections in the tunnel.
Figure 3:
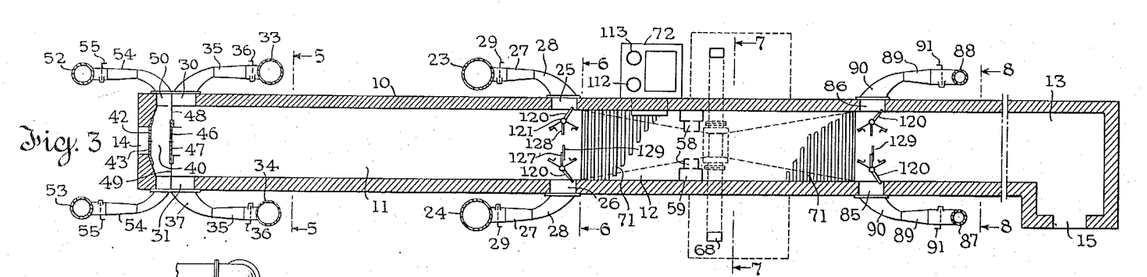
Fig. 3 is a horizontal section of a portion of the plant including a tunnel in which are combined heating, "dusting," and cooling means, and an arrangement of flues for gases that are circulated in the tunnel.

Referring to Figs. 1, 2 and 3, there is shown an elongated, multisection chamber, or tunnel, or enclosure, designated conveniently as a tunnel and generally by the numeral 10. This tunnel includes in series a heating section or chamber 11, a "dusting" section or chamber 12 and a cooling section or chamber 13, each of which is of any suitable shape and dimensions provided with dust-impervious roof and walls. The tunnel 10 is provided with an inlet end 14 and an outlet end 15. An overhead track 16 extends the length of the tunnel 10 interiorly from inlet to outlet and exteriorly from outlet to inlet, forming a continuous loop for the rack conveyor or for sheet carriers 17, particularly adapted for use in the present apparatus and more fully described below. Though the outlet 15 is shown at a side of the tunnel, it may be directly at the end and the track 16 may pass straight through and follow any desired course.

Figure 6:
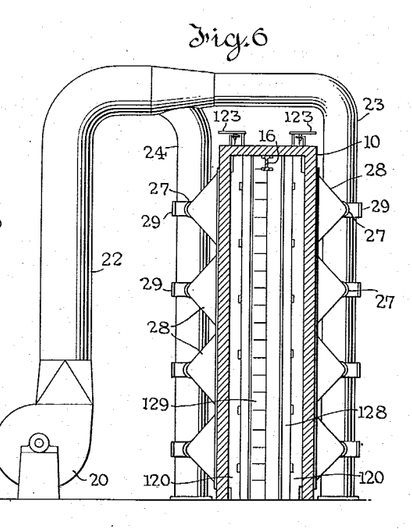

Air or other gases, suitably inert with respect to bituminous coating materials, are employed as heating media in the heating section 11 and in the "dusting" section 12. A furnace 18 provided with a burner 19 heats the gaseous medium, such as air for instance, which is circulated by means of a blower 20 that is rotated by means of a variable speed motor 21. The blower 20 is connected to a vertical hot-air feed-pipe 22 which in turn is connected to branch pipes 23 and 24 positioned on opposite sides of the tunnel 10, as shown in Fig. 6, adjacent vertically elongated inlet openings 25 and 26, respectively, opposite each other in the sides of the tunnel between, or at the intersection of, the heating section 11 and the "dusting" section 12. A plurality of branch flues 27 at various levels connects the pipe 23 to the opening 25, and the pipe 24 to the opening 26. Each of the flues 27 has an end section 28 that flares outwardly toward the hot air inlet to which it is connected. Also, each of the flues 27 is provided with a slide valve 29 for regulating the hot air supply to the various levels in the tunnel in a manner and for purposes to be described.

Adjacent the inlet end 14 of the tunnel 10, are hot-air outlets 30 and 31 opposite each other in the sides of the tunnel and similar to hot-air inlets 25 and 26. A pipe 32 connects the air-intake end of the furnace 18 to branch pipes 33 and 34 which are in turn connected to the hot-air outlets 30 and 31 respectively by branch flues 35 similar to branch flues 27 and in a similar manner. Each of the flues 35 is provided with a slide valve 36 and a flared section 37.

Circulation of hot-air through the heating section 11 is established by the blower 20 and associated pipes and flues, preferably countercurrent to the direction of travel of sheets under treatment.

Figure 4:
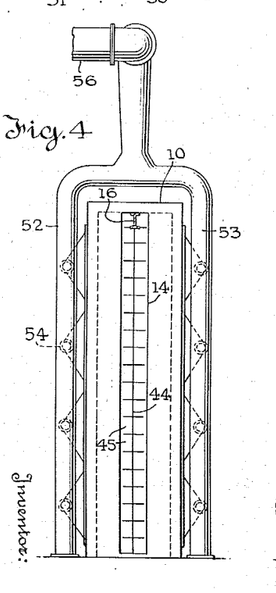
Fig. 4 is a view in the inlet end of the tunnel.
Figure 5:
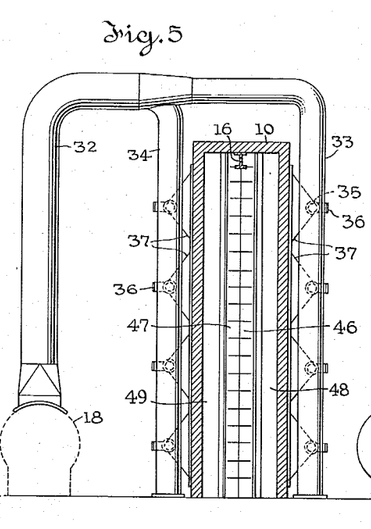
Figs. 5, 6, 7 and 8 are sectional views taken on lines 5—5, 6—6, 7—7, and 8—8 respectively of Fig. 3.

An air lock 40 at the tunnel entrance 14 serves to prevent cold air outside the tunnel from diluting the hot air in the heating section 11. As shown in Figs. 3, 4 and 5, the air lock is constructed by providing an enclosed air space, at the entrance 14, from which air is continuously drawn by an exhaust fan 41 (Fig. 1) while sheets are conveyed through the tunnel 10. Heat-resistant yieldable rubber strips or spring metal strips 42 and 43 fastened to the opposite sides of the entrance 14 extend inwardly across the entrance, and their inner edges meet in a vertical line 44 from the track 16 to the floor of the tunnel 10. Each of the strips 42 and 43 is slit at intervals horizontally and outwardly from the line 44 to form a plurality of flaps 45 which normally keep the entrance 14 closed. The flaps 45 are just long enough to permit the passage of a loaded rack 17 into the tunnel 10. During such passage, the flaps are bowed or forced aside and then spring back to their normal position thereby closing the entrance after a rack has been moved completely therethrough.

Strips 46 and 47 similar to strips 42 and 43 are affixed to and extend inwardly from the inner edges of solid, rigid walls 48 and 49 respectively, which are in turn in alignment with the sides of the openings 30 and 31, respectively, nearest the entrance 14. The walls 48 and 49 are spaced from the entrance 14 and form one side of the exhaust openings 50 and 51, respectively, to which are respectively connected vertical branch pipes 52 and 53 at the flared ends of the branch flues 54 similar to flues 27 and 35. Flues 54 are each provided with a slide valve 55. The branch pipes 52 and 53 are connected to the exhaust fan 41 by means of a pipe 56.

In the "dusting" section 12, means are provided for applying "dust" to a metal sheet precoated with a thermoplastic material that has been rendered uniformly sticky over its entire surface while passing through the heating section 11. One form of "dust" distributing means is shown in detail in Figs. 12 and 13. The latter means comprises a dust chute 58 associated with an air flue 59, both extending vertically from the floor of the "dusting" section 12 through the roof of the tunnel 10. The side walls of the flue 59 are fastened to a vertical side wall of the tunnel. Substantially throughout its height within the tunnel, the wall 60 of said flue, facing the path of a sheet conveyed through the tunnel, is provided with a plurality of small openings 61 uniformly spaced one above the other. The chute 58 is fastened to the wall 60 of the flue 59 and is provided with a slot 62 in a wall 63 opposite the wall 60. The slot 62 extends vertically substantially the entire length of the chute 58 inside the tunnel, and is slightly wider than the diameter of the openings 61. The centers of the openings 61 and the center line of the slot 62 are in a plane substantially perpendicular to the line of travel of a sheet under treatment in the tunnel.

The width of the upper end of the chute 58 is substantially equal to the width of the flue 59, and the side walls 64 and 65 of the chute 58, as they extend downwardly, converge so that at the floor of the tunnel the distance between these walls is substantially the width of the slot 62. This convergence of the "dust" chute walls tends to maintain the "dust" at about the same concentration throughout the height of the chute 58. In other words, it is made possible to provide a uniform dispersion or suspension of the "dust" adjacent the entire area of a tacky surface of a sheet.

Figures 9, 10, 11, 12, 13:
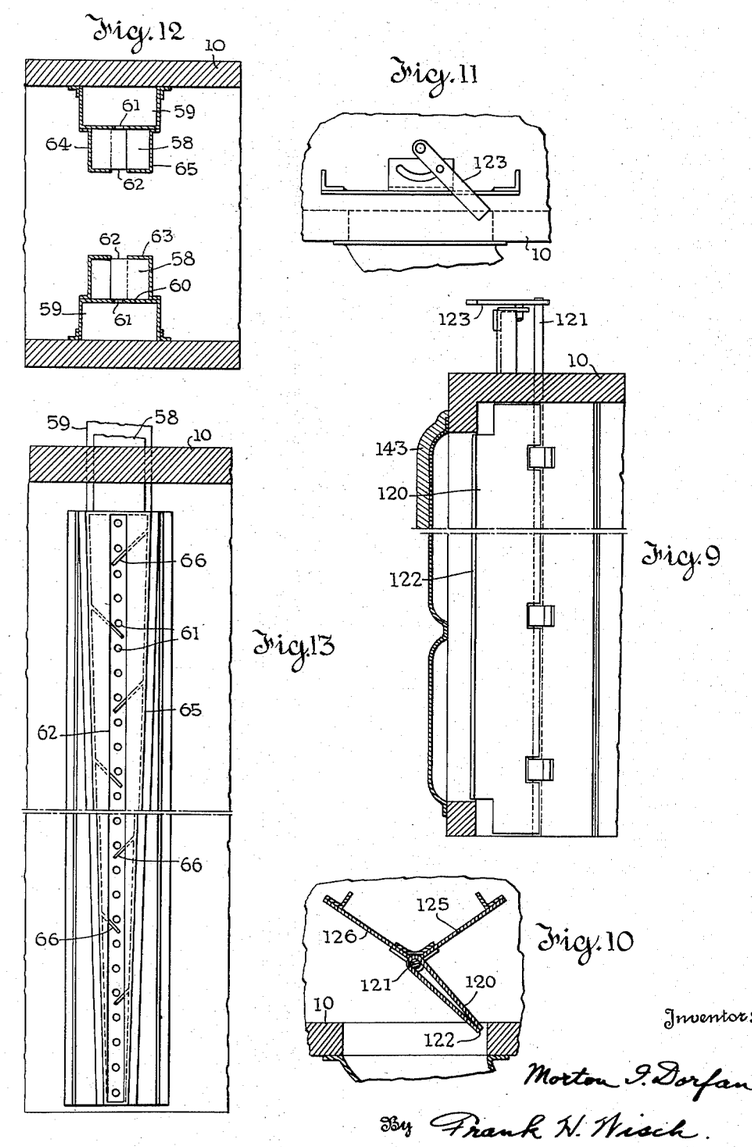
Figs. 9, 10 and 11 are fragmentary views of damper means for controlling the flow of heating gases.
Fig. 12 is a sectional view of one form of "dust-applying" means.
Fig. 13 is a front elevation of said means viewed from a side of a passing sheet under treatment.

Baffles 66 are provided in the chute 58 to break the fall of the dust particles and thus decrease their vertical velocity so that they are more readily forced horizontally toward a sheet. The baffles 66, as shown in Fig. 13, extend partly across the chute 58 at intervals alternately from the walls 64 and 65. They are inclined downwardly from said walls, and the free edge of each is positioned just past or substantially at the center line of the slot 62. When the "dust" employed consists of particles of a light flaky material, such as mica, or material of relatively low density such as fibrous substances, the baffles are not essential.

A "dust" projecting means is provided on each side of the line of travel of a sheet and preferably substantially equidistant from each side of a sheet in the "dusting" section 12, as shown in Figs. 3 and 12, for coating both sides of a sheet.

Figures 7, 8:
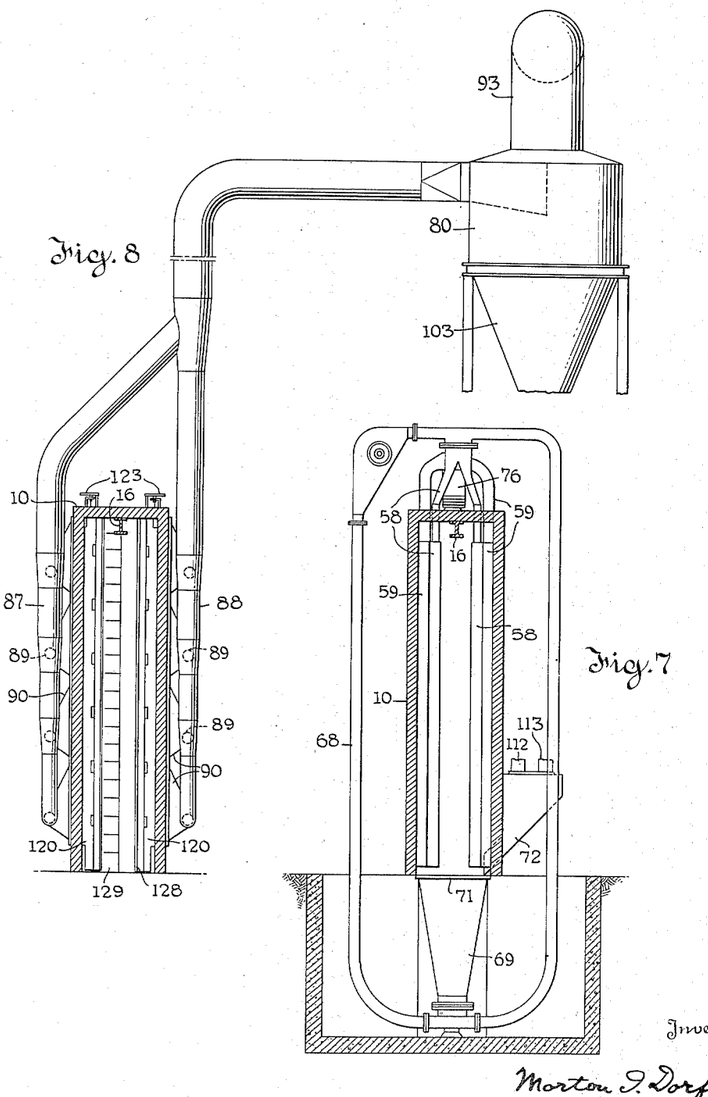

To supply "dust" to the chutes 58, a Redler conveyor 68, as shown in Figs. 2 and 7, or an enclosed, endless bucket conveyor, carries "dust" from the "dust" pit 69 beneath the "dusting" section 12 to above the roof of the tunnel 10. The "dust" is dropped by the conveyor, preferably continuously, into the upper end of each chute 58 and it is distributed equally to these chutes by a divider plate 70, the top edge of which is shown in Fig. 2.

The floor of the "dusting" section 12 is an open grating 71 so that the projected, unused "dust" settling down in section 12 falls into the pit 69 where it is picked up again by the conveyor 68 which is driven by a motor 68'. Make-up "dust" is supplied from a bin 72 from which the "dust" drops into the pit 69.

Air supplied to the flues 59 is heated air from the furnace 18 and is tapped from the pipe 23 through a pipe 75 to a fan 76 driven by a variable speed motor 76' which forces the hot air under a desired pressure through a pipe 77 into the flues 59. An advantage of the use of hot air in the flues 59 is that it heats the "dust" so that hot particles thereof will lodge more readily in or on a thermoplastic coating material upon impingement. Each of the flues 59 is supplied with hot air preferably at the same temperature and pressure so that the coating effect of the "dust" on both sides of a sheet is more likely to be the same.

Unused "dust" that is in suspension in the "dusting" section 12 and that does not readily settle out therein is separated from the air by means of a cyclone separator 80 and by means, in a separator housing 81, including a filter 82, through which the air is drawn and blown out through a pipe 83 by a suction fan 84 driven by a variable speed motor 84ª. The cyclone 80 is connected to outlet openings 85 and 86 (Fig. 3) opposite each other on the sides of the tunnel 10 between or at the intersection of the "dusting" section 12 and the cooling section 13. Pipes 87 and 88, on opposite sides of the tunnel 10, and leading to the cyclone separator 80, are connected to the openings 85 and 86, respectively, by means of branch flues 89, similar to branch flues 27, each having a flared section 90 and a slide valve 91. The pipes 87 and 88 are tapered from the uppermost to the lowermost branch flues 89 to permit of easier withdrawal of air upwardly to the "dust" separator system.

The air outlet pipe 93 of the cyclone separator 80 leads into the top of the first section 94 of the separator housing 81 in which is provided a vertical baffle 95 having its lower edge 96 above a hopper 97. Some of the dust that is not separated in the cyclone 80 is separated in section 94 as the air passes down one side of the baffle 95 and up the other to the opening 98 leading into the filter section 99 in the separator housing 81. Any suitable lever, means 100, operated by mechanism (not shown) in space 100ª, for shaking the dust from the filter 82 may be provided, as for example, such as that shown in Patent No. 1,868,876.

The filter section 99 is provided with discharge hoppers 101 and 102 arranged in line with the hopper 97 and the cyclone discharge hopper 103. A rapping means 100ᵇ of the type shown in Patent No. 1,775,304 is provided for each of these hoppers. A screw conveyor means 104, driven from any suitable power source, is positioned beneath these hoppers for receiving the "dust" discharged therefrom. The "dust" from these hoppers is generally progressively finer as the air current passes from the cyclone 80 to the far end of the filter section 99, and is thus classified for reuse in the coating operation. The larger particles from the cyclone 80 and from section 94 are passed by the conveyor 104 to a conveyor 105 which drops the "dust" into a chute for introduction into the hopper 72.

A portion of the blade 107 of the conveyor 104 is so arranged that the "dust" from the hopper 103 of the cyclone 80 is pushed either into the conveyor 105 or beyond the conveyor 105 to a conveyor 109. The "dust" from the hopper 97 drops into the conveyor 104 and may then drop into either the conveyor 105 or the conveyor 109. The "dust" from hoppers 101 and 102 drops into conveyor 104 and then into conveyor 109. The end portion 111 of the conveyor blade extending from beneath the hopper 102 to the conveyor 109 is arranged to push the recovered "dust" from hopper 102 to conveyor 109.

A chute 112 connects the discharge end of the conveyor 105 with the hopper 72. A chute 113 having a slide valve 114 connects the discharge end of the conveyor 109 with a hopper 72 and is provided with a branch chute 115 having a slide valve 116.

In certain instances, particle size is a criterion in a "dusting" operation and it is desirable in such cases to return only the larger particles to the "dusting" chamber 12. When the larger particles of a "dust," satisfactory for a particular coating, settle in the cyclone hopper 103 and in hopper 97, and when the finer particles, of smaller and less desirable size, settle in hoppers 101 or 102 or both, as is generally the case in the use of mica for instance, the conveyors 104 and 105 are put into operation so that the larger particles will be conveyed to the chute 112. With conveyor 109 also in operation, and with slide valve 114 in chute 113 closed and slide valve 116 in chute 115 open, the smaller particles are discarded and are not returned to the hopper 72. By closing the valve 116 and opening the valve 114 all of the recovered "dust" may be returned to the hopper 72.

If, for certain purposes, attritional "dust" or very fine particles of the "dust" are not desirable for a particular surface coating, or if the recovered "dust" is not to be used in the dusting chamber, all of the recovered "dust" may be discarded through chute 115 by stopping the operation of conveyor 105, by operating conveyors 104 and 109, by closing the valve 114, and by opening valve 116.

For purposes of assisting in controlling and distributing air currents in the sections 11, 12 and 13, a damper means is placed at each of the openings 25, 26, 85 and 86. This damper means, illustrated in Figs. 3, 9, 10 and 11, includes a damper plate 120 extending vertically from the bottom to the top of each of these openings. One vertical edge of a damper plate 120 is affixed to a rotatable vertical rod 121, serving as an axis, positioned in the tunnel 10 adjacent an opening so that the free vertical edge 122 of the damper can be swung in an arc from one side of the opening to the other. By setting a damper in a predetermined position in the openings 25 and 26 for instance, a portion of the entering gaseous heating medium may be diverted by the damper 120 into the "dusting" chamber and the remainder into the heating chamber or all of the medium may be diverted into the heating chamber by setting the free edge 122 of the damper tightly against the side of each opening 25 and 26 nearest the dusting chamber. The rod 121 extends through the roof of the tunnel 10. A lever 123 above the roof engages the rod 121 for operating the damper. The position of the lever readily indicates the position of the damper. Metal bracing plates 125 and 126 maintain the rod 121 in position in the tunnel 10.

In alignment with the axis of each pair of the dampers 120 at either end of the dusting section 12, are solid, rigid walls 127 and 128 which extend from said axes on either side to within a short distance from the center line of the tunnel 10, as shown in Fig. 3. In order to maintain the dusting section 12 as well enclosed as possible during the passage of racks 17 of the carrier therethrough, a rubber strip or a spring metal strip 129 (Figs. 3, 6 and 8) similar to strip 49 is fastened to each of the walls 127 on the rack side of the carrier. A rubber strip is preferably not placed on the sheet side because of the tendency to mar the heat-softened surface of a coating on the sheets under treatment.

The racks 17, shown in Figs. 1, 14 and 15, are supported on rollers 136 on the track 16 and are suspended substantially vertically therefrom. The racks are driven in spaced relation to each other by any suitable means as a chain drive 130A in association with a power mechanism, designated generally by 131, of any desired type. A rack comprises a trapezoidal frame having side bars 132 and 133, and tapering from the lower end to the top cross bar 134. Bracket means 135 at the lower end of the frame serves to support the lower edge of a sheet under treatment away from the plane of the side bars so that the sheet may lean against the frame and be held by its own weight, as shown in Fig. 1, with metal sheet material 136. Suitable means for further securing the sheet on a rack may be provided if found necessary. An important consideration is that a sheet should be exposed as much as possible so that its entire surface is readily accessible to the "dust" material applied in the tunnel. If only one side of a sheet is to be coated with "dust" in the "dusting" section 12, a metal blocking plate may be temporarily placed across the slot 62 of the "dusting" means on the side of the sheet that is to remain uncoated. "Dusts" of higher specific gravities are particularly suitable for application in this manner.

For purposes of determining conditions in the tunnel 10, thermometers, readable from the outside thereof, are placed at various levels. A thermometer 138 (Fig. 1) near the bottom and top of the heating section 11 and "dusting" section 12, and one midway between, serve to indicate whether sufficiently uniform temperature conditions are being maintained at the various levels. A thermometer 139 is also mounted on the hot-air feed pipe 22 just above the blower, for indicating the initial temperature of the air passing from the furnace to the tunnel 10.

A pressure indicating device 140 is mounted on the outside of the tunnel 10 to indicate the pressure in the heating section on a scale 141 and the pressure in the "dusting" section on a scale 142.

The walls and roof of the tunnel 10, particularly the heating and "dusting" sections, and the various hot-air conducting means are heat insulated. A heat insulating layer 143 is shown in Fig. 9 by way of illustration.

By way of a modification, to further improve the cooling effect in the cooling section 13 of the tunnel 10, instead of having only one opening for withdrawing dust-laden air from the dusting section 12, and for drawing cooling air through the cooling section, a separate pipe connection, similar to pipes 87 and 88 and their branch flues, is provided for each of two pairs of opposite openings 150, 151 (for the "dusting" chamber), and 152, 153 (for the cooling chamber). The air withdrawn passes to the cyclone by way of pipe 154. Instead of employing vertical damper means in this case, a partition means similar to that designated by the numerals 48 and 49 (Figs. 3 and 4) is placed between the pairs of said openings, except that a sealing strip is omitted on the side of the rack on which a sheet is placed.

In the operation of the apparatus of the present invention, the racks 17 are moved along the track 16 at a suitable rate and as they pass by a loading platform 156 near the entrance to the tunnel 10, a metal sheet, precoated with a thermoplastic coating that is capable of being rendered sticky by heat, is placed in vertical position on each rack. The loaded racks are conveyed in succession continuously through the length of the tunnel 10 wherein the coating is heated in the heating section 11 to provide a uniformly sticky surface over the entire area of the sheet; the sheet bearing the sticky surface is uniformly sprayed with a "dust" in the "dusting" section 12; and the "dusted" sheet is then cooled in the cooling section 13. Upon emerging at the outlet of the tunnel 10, or at any point beyond the outlet, a sheet is substantially ready for use and is removed from the rack. The rack returns to the platform 156 where it is reloaded.

Figure 17:
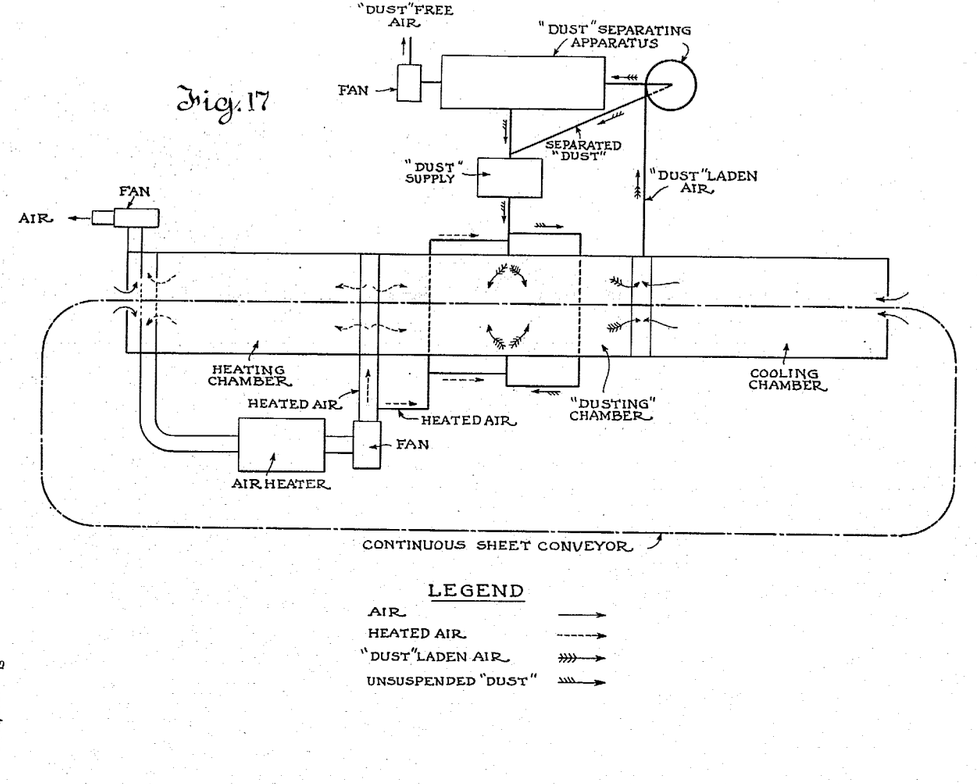
Fig. 17 illustrates diagrammatically the operation of apparatus to be described.

The general operation is somewhat graphically represented in Fig. 17 of the accompanying drawings. Reference to this figure may be made in conjunction with the other figures showing details of the apparatus.

While passing thermoplastic coated sheets through the several sections in succession in the tunnel 10, air or other suitable gas, heated to a desired temperature, is introduced through the openings 25 and 26 in opposite sides of the tunnel between the "dusting" section 12, and the heating section 11. Some of the hot-air passes on both sides of the sheets into the "dusting" section and is maintained uniformly circulated therein at uniform temperature in contact with the entire tacky surfaces of the sheets; but a larger proportion of the hot air passes on both sides of the sheets from the openings 25 and 26 into the heating section and is therein also maintained uniformly circulated at uniform temperature in contact with the entire surface of the coating that is to be rendered tacky. Simultaneously with these operations, the hot air is drawn through the heating section on both sides of the sheets countercurrent to the direction of travel of said sheets; hot air is drawn through the "dusting" section concurrently with the sheets; the "dust" is blown onto both sides of the sheets in the "dusting" section; the dust-laden air is withdrawn from the "dusting" section through openings 85 and 86 in opposite sides of the tunnel; and a cooling air current is drawn through the cooling section countercurrent to the direction of travel of the sheets and on both side sthereof, leaving either through openings 85 and 86, or through auxiliary openings 152 and 153 (Fig. 16) by way of modification. Other operations may proceed simultaneously with the above operations and either continuously or intermittently, as for instance, the classification of the "dust" in the "dust" separating apparatus and the refeeding of recovered "dust" into the "dusting" section, which has been described hereinabove. The entire apparatus is capable of operating as a unit while effectively preventing escape of dust into the surrounding atmosphere.

Referring to the operation of the apparatus more in detail, the control of the flow and distribution of heating gas to obtain uniform temperature conditions throughout the heating section is of utmost importance. For any given heating temperature, the gaseous heating medium is preferably so distributed that the entire area of both sides of a thermoplastic coated metal sheet is heated at substantially the same temperature to render the surface of the thermoplastic coating uniformly soft or uniformly sticky over its entire area.

A manner of accomplishing this in the heating section 11 of the tunnel 10, particularly when temperatures employed are in the higher ranges for treating certain bituminous coatings, is to introduce a greater portion, or preferably all, of the hot gas passing from the furnace 18 into the heating section 11, through openings 25 and 26 near the bottom thereof. The hot gas thus introduced fans out vertically uniformly from the bottom to the top in the heating section on both sides of the sheets under treatment, and, at the same time, the gas is kept moving horizontally toward the openings 30 and 31 at a velocity which prevents the hot gas from accumulating in a stratum or region in an upper zone. The heating gas, upon approaching the sheet-inlet-end of the heating section, is then, in larger proportion or preferably substantially entirely, withdrawn near the bottom of the openings 30 and 31. The fan 20 is of a capacity to cause cyclic passage of the heating gas at the proper velocity from the furnace 18 through the heating section 11 and back through the furnace.

The course taken by the heating gas in the heating section 11 depends largely on the point or points of introduction and withdrawal of the heating gas, and its velocity of throughput. With the equipment shown in the accompanying drawings, the course of the heating gas is controlled by means of the fan 18 and by means of the valves 29 in the branch flues 27 of pipes 23 and 24, and the valves 36 in the branch flues 35 of pipes 33 and 34. By adjusting valves 29, the heating gas is either entirely introduced into the heating section 11 through the bottom flues 27 connected to the lower end of each of the openings 25 and 26 as indicated in the preferred operation above; or the heating gas is introduced through openings 25 and 26 in varying proportions at the various levels of the flues 27, as for instance in decreasing proportions from the bottom flue to the top flue. The withdrawal of the heating gas from the heating section is controlled by correspondingly adjusting the valves 36 in the flues 35.

The vertical dampers 120 are adjusted at both ends of the "dusting" section 12 by means of levers 123 to control the flow through said section of hot gas entering the tunnel 10 at openings 25 and 26. Most of the gas entering the "dusting" section is drawn through from the heating section directly in contact with the sheet surfaces and directly along the line of travel of the sheets. This not only maintains the sheets at the proper temperature and maintains the sheets uniformly tacky to the point of application of the "dust," but also prevents "dust" from escaping into the heating section from the "dusting" section. The operation of means for applying and for handling the "dust" has previously been described.

The "dust" is further prevented from escaping into the cooling section 13 by adjustment of the vertical dampers 120 at the junction of the "dusting" section and the cooling section. The dampers are here set to cause the cooling air to be drawn from the exit 15 along the line of travel of the sheets and on both sides thereof, partly through the opening between the walls 127 and 128 and then through the openings 85 and 86, and partly directly from the cooling section through the openings 85 and 86.

"Dust" is also kept from seeping out of the "dusting" section by maintaining a slight vacuum therein or by maintaining a slightly higher pressure in the heating section than in the "dusting" section. A difference in pressures of about .10 inch in the heating section and in the "dusting" section is found to be satisfactory. Assuming that the valves 91 are all set, the pressure in the "dusting" section may be maintained lower than that in the heating section by means of proportioning the air supply with the dampers 120 so that most of the air from pipes 23 and 24 will flow into the heating section, and/or by increasing the rate of withdrawal of air from the "dusting" section by means of the suction fan 84.

To help prevent the "stacking effect" and to overcome normal stratification effects in the "dusting" section and thereby maintain uniform temperature in the latter section at various levels on both sides of the sheets, the valves 91 in the branch flues 89 on both pipes 87 and 88 are adjusted. As in the heating section, and while operating it in a preferred manner described above, a desired effect is obtained by withdrawing all or most of the gases from the dusting section through the lower end of each of the openings 85 and 86. This can be accomplished by opening wide the lowermost valve 91 on each side and completely or partially closing the upper valves 91 on each side.

The thermometers at the various levels in the heating section 11, as well as in the "dusting" section 12, are watched by the operator, and adjustments are made to maintain substantially no differences in temperature between the upper and lower levels.

The operating temperatures employed may be widely varied and depend on (1) the rate of feed of sheet material through the heating and "dusting" sections, (2) the softening-point of the thermoplastic coating, (3) the temperature of the coated article upon entering the heating section, (4) the gauge or thickness of the metal sheet employed as a base, and (5) the temperature of the atmosphere outside of the heating and "dusting" sections. In general, the temperature in these sections should not be too high to cause melting or flowing of the thermoplastic coating and should preferably be such that only the outer surface of the coating is heated while the metal of the sheet remains at a relatively low temperature.

In general, for large quantity production a precoated metal sheet is conveyed through the heating and "dusting" sections of the tunnel shown, at the highest speed at a temperature that will result in satisfactory adhesion of particles to the coated sheet. A relatively short period of preheating in the heating section at a fairly high temperature is generally the aim of the operator, though this may vary depending, among other things, on the nature of the thermoplastic coating. A speed that provides for a period of heating in the heating section of about 0.8 minute to 2½ minutes at about 300° to about 400° F. and in the "dusting" section of about 0.6 minute to about 2 minutes at about 240° to about 290° F. is suitable for certain thermoplastic coatings on flat or corrugated metal sheets of 18 to 28 gauge. Speeds of from about 6 feet per minute to about 18 feet per minute have been employed in the tunnel 10.

A preferred thermoplastic coating comprises a material that can be applied by dipping or by spraying while in molten condition; that dries and hardens relatively quickly and becomes substantially non-tacky at ordinary atmospheric temperatures; that has strong adhesive powers and becomes sticky on heating; that does not flow readily on metal surfaces in vertical position during the period of heating in the above-described tunnel; that becomes sticky on heating before it commences to flow; and that has a relatively high softening-point, (above about 90° C.), relatively high penetrations (above 10) at 32° F. with 200 gms. 60 seconds, and relatively low penetrations (below 70) at 115° F. with 50 gms. 5 seconds, so that it will not be too brittle at freezing temperatures and will not flow on vertical metal surfaces at highest atmospheric temperatures (130° F.) or when exposed to atmospheric conditions. In cases where a coating flows comparatively readily when heated to render it sticky, a sheet coated therewith may be conveyed through the tunnel at a high enough speed so that flowing is avoided.

Pitches and asphalts and other thermoplastic materials used in coating compositions having the above preferred characteristics are particularly applicable in the above-described process. Coal-digestion pitches prepared by digesting coal in oil or tar at temperatures of approximately 300° to 310° C., and by dispersing the coal, which is preferably thermally decomposed, in the bituminous medium, are highly satisfactory particularly when they contain heavy hydrocarbon oil and coal in proportions that give a composition of the above-mentioned preferred softening-point and penetration ranges. By way of example, reference is made to U. S. Patent No. 2,395,041, to William F. Fair, Jr., for compositions of this type. When heating coatings of coal-digestion pitch, having the above preferred softening-point and penetration characteristics, on a metal sheet, they may initially become soft in certain ranges of temperature and yet in those ranges they do not flow even on vertical metal surfaces.

The following example illustrates more specifically the present process:

Flat or corrugated metal sheets of the type generally employed for roofing or siding, and coated with coal-digestion pitch having a softening-point of about 100° to about 115° C. and penetrations at 32° C. above substantially 10 and at 115° F. below substantially 70, are placed on the racks 17 and are conveyed through the tunnel 10 at a speed of about 12 to 17 feet per minute. This corresponds to a period of time in the heating section 11 of about 0.9 minute to about 1¼ minutes, and in the "dusting" section of about 0.6 minute to about 0.8 minute. The temperature in the heating section is between about 300° F. and about 400° F., or more particularly at about 350° F. The temperature in the dusting section is between about 240° F. and about 290° F., or more particularly at from about 260° F. to about 280° F.

The entire surface of each vertically supported, pitch coated sheet is exposed in the heating section to a substantially uniform temperature over the extent of the surface area of the coating to render the surface of the coating substantially uniformly sticky throughout. While this uniform stickiness is maintained in the "dusting" section, the solid, particulate material such as mica, or other particulate material mentioned above, is impelled toward and impinges and is uniformly spread on the uniformly sticky surface of the coating. The "dust"-coated sheets then pass into and through the cooling section where they are quickly cooled by currents of cooling air in contact with and uniformly spread over the entire coated surface. The thermoplastic coating hardens uniformly and forms a solid bond for the particulate material.

The "dusts" employed comprise, generally, a substance or substances, solid colored or varicolored, insoluble in water and other solvents, inert with respect to the thermoplastic material provided as a bond, inert with respect to the gaseous heating medium circulated in the tunnel, and non-fusible at the temperatures in the tunnel. Other properties of said "dusts" have been hereinbefore pointed out.

In the above-described invention, large sheets are easily treated in a relatively small space, without the need for complicated mechanisms and with very little handling by workmen. In treating such sheets in vertical position, accumulation of "dust" on a sheet is avoided, and yet in a single "dusting" treatment "dust"-coated sheets are obtained which are free from defects such as bare spots or uncoated areas, and such as wrinkles due to sagging. Uniform stickiness of the entire area of a thermoplastic precoat on a sheet, effectively provided in this invention by uniform heating of said area, assures uniform coverage by uniform distribution of the "dust" during maintenance of said uniform stickiness.

The invention as hereinabove set forth is embodied in particular form and manner but may be variously embodied within the scope of the claims hereinafter made.

What is claimed is:

1. In a method of producing a granule-coated base, in which method granules are distributed on and attached to a base by means of a thermoplastic bituminous coating that is rendered tacky on heating; the steps comprising circulating in contact with all portions of an area of the surface of the coating that has previously been hardened on said base a gaseous heating medium maintained at a uniform temperature in a range in which the said surface in said area is maintained substantially uniformly tacky and said coating non-flowing, and while so circulating said gaseous heating medium and maintaining said area uniformly tacky and said coating non-flowing projecting solid granules onto the said surface in said area to coat said surface uniformly with said solid granules.

2. In a method of producing a granule-coated base, in which method granules are distributed on and attached to a corrugated metal base by means of a thermoplastic bituminous coating that is rendered tacky on heating; the steps comprising circulating in contact with all portions of an area of the surface of the coating that has previously been hardened on said corrugated metal base a gaseous heating medium maintained at a uniform temperature in a range in which the said surface in said area is maintained substantially uniformly tacky and said coating non-flowing, and while so circulating said gaseous heating medium and maintaining said area uniformly tacky and said coating non-flowing projecting solid granules onto the said surface in said area to coat said surface uniformly with said solid granules.

3. In a method of producing a granule-coated base, in which method granules are distributed on and attached to a base by means of a thermoplastic bituminous coating that is rendered tacky on heating; the steps comprising circulating in contact with all portions of an area of the surface of the coating that has previously been hardened on said base a gaseous heating medium maintained at a uniform temperature in a range in which the said surface in said area is maintained substantially uniformly tacky and said coating non-flowing, and while so circulating said gaseous heating medium and maintaining said area uniformly tacky and said coating non-flowing projecting solid granules onto the said surface in said area to coat said surface uniformly with said solid granules, and cooling the thus coated sheet to form a solid bond for the said solid granules.

4. In a method of producing a granule-coated base, in which method granules are distributed on and attached to a base by means of a thermoplastic bituminous coating that is rendered tacky on heating; the steps comprising circulating in contact with all portions of an area of the surface of the previously hardened coating on opposite sides of said base a gaseous heating medium maintained at a uniform temperature in a range in which the said surface in said area is maintained substantially uniformly tacky and said coating non-flowing, and while so circulating said gaseous heating medium and maintaining said area uniformly tacky and said coating non-flowing projecting solid granules onto the said surface in said area on each of said opposite sides to coat said surface uniformly with said solid granules.

MORTON I. DORFAN.

REFERENCES CITED

The following references are of record in the file of this patent:

UNITED STATES PATENTS

| Number | Name | Date |
| --- | --- | --- |
| 1,269,906 | Clarke | June 18, 1918 |
| 1,488,186 | Young | Mar. 25, 1924 |
| 1,952,502 | Kinkead | Mar. 27, 1934 |
| 2,099,093 | Avery | Nov. 16, 1937 |
| 2,235,978 | Braucher | Mar. 25, 1941 |
| 2,314,436 | Anderson | Mar. 23, 1943 |